(12) United States Patent
Hoshino

(10) Patent No.: US 10,547,094 B2
(45) Date of Patent: Jan. 28, 2020

(54) BATTERY-PACK CASE

(71) Applicant: NGK INSULATORS, LTD., Nagoya (JP)

(72) Inventor: Koji Hoshino, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 525 days.

(21) Appl. No.: 15/064,897

(22) Filed: Mar. 9, 2016

(65) Prior Publication Data

US 2016/0190666 A1 Jun. 30, 2016

Related U.S. Application Data

(63) Continuation of application No. PCT/JP2014/072371, filed on Aug. 27, 2014.

(30) Foreign Application Priority Data

Sep. 11, 2013 (JP) .................................. 2013-188268

(51) Int. Cl.
| | |
|---|---|
| *H01M 10/6571* | (2014.01) |
| *H01M 10/615* | (2014.01) |
| *H01M 2/30* | (2006.01) |
| *H01M 2/10* | (2006.01) |
| *H01M 2/20* | (2006.01) |

(52) U.S. Cl.
CPC ..... *H01M 10/6571* (2015.04); *H01M 2/1022* (2013.01); *H01M 2/1088* (2013.01); *H01M 2/208* (2013.01); *H01M 2/305* (2013.01); *H01M 10/615* (2015.04)

(58) Field of Classification Search
None
See application file for complete search history.

(56) References Cited

U.S. PATENT DOCUMENTS

| | | | |
|---|---|---|---|
| 2003/0215702 A1* | 11/2003 | Tanjou | H01M 2/204 429/127 |
| 2005/0253466 A1 | 11/2005 | Seguchi et al. | |
| 2005/0264257 A1* | 12/2005 | Inui | B60L 1/10 320/104 |

(Continued)

FOREIGN PATENT DOCUMENTS

| | | |
|---|---|---|
| CN | 202395066 U | 8/2012 |
| DE | 3427028 A1 | 1/1986 |

(Continued)

OTHER PUBLICATIONS

Extended European Search Report, European Application No. 14843259.4, dated Mar. 24, 2017 (7 pages).

(Continued)

*Primary Examiner* — Amanda J Barrow
(74) *Attorney, Agent, or Firm* — Burr & Brown, PLLC

(57) ABSTRACT

A battery-pack case includes a container that accommodates a battery pack and has an opening in the top surface thereof, a lid that closes the opening, and a plurality of heater units provided inside the container. The heater units include a first heater unit provided at the bottom of the container and a second heater unit provided on a side wall of the container. A first heater and a second heater that constitute the first heater unit are connected in series, as are third through sixth heaters that constitute the second heater unit.

4 Claims, 14 Drawing Sheets

(56) References Cited

U.S. PATENT DOCUMENTS

2008/0213652 A1* 9/2008 Scheucher ............... B60L 8/00
                                                    429/62
2013/0068755 A1* 3/2013 Frutschy ............... H05B 3/141
                                                   219/542

FOREIGN PATENT DOCUMENTS

| JP | 56-116285 A1 | 9/1981 | | |
|----|---|---|---|---|
| JP | 62-190682 A1 | 8/1987 | | |
| JP | 04-012472 A1 | 1/1992 | | |
| JP | 06-283215 A1 | 10/1994 | | |
| JP | 08-078051 A1 | 3/1996 | | |
| JP | 2004-075103 | * | 8/2002 | ............ B65D 51/10 |
| JP | 2004-047208 A1 | 2/2004 | | |
| JP | 2004-075103 A1 | 3/2004 | | |
| JP | 2004-087430 | * | 3/2004 | ............ H01M 10/39 |
| JP | 2004-087430 A1 | 3/2004 | | |
| JP | 2005-328661 A1 | 11/2005 | | |
| JP | 2010-097923 A1 | 4/2010 | | |

OTHER PUBLICATIONS

International Search Report and Written Opinion (Application No. PCT/JP2014/072371) dated Sep. 22, 2014.
Japanese Decision to Grant a Patent (Application No. 2015-536518) dated Jan. 9, 2018 (with English translation).
Chinese Office Action and Search Report (Application No. 201480050215.2) dated Jun. 8, 2018 (with English translation).

* cited by examiner

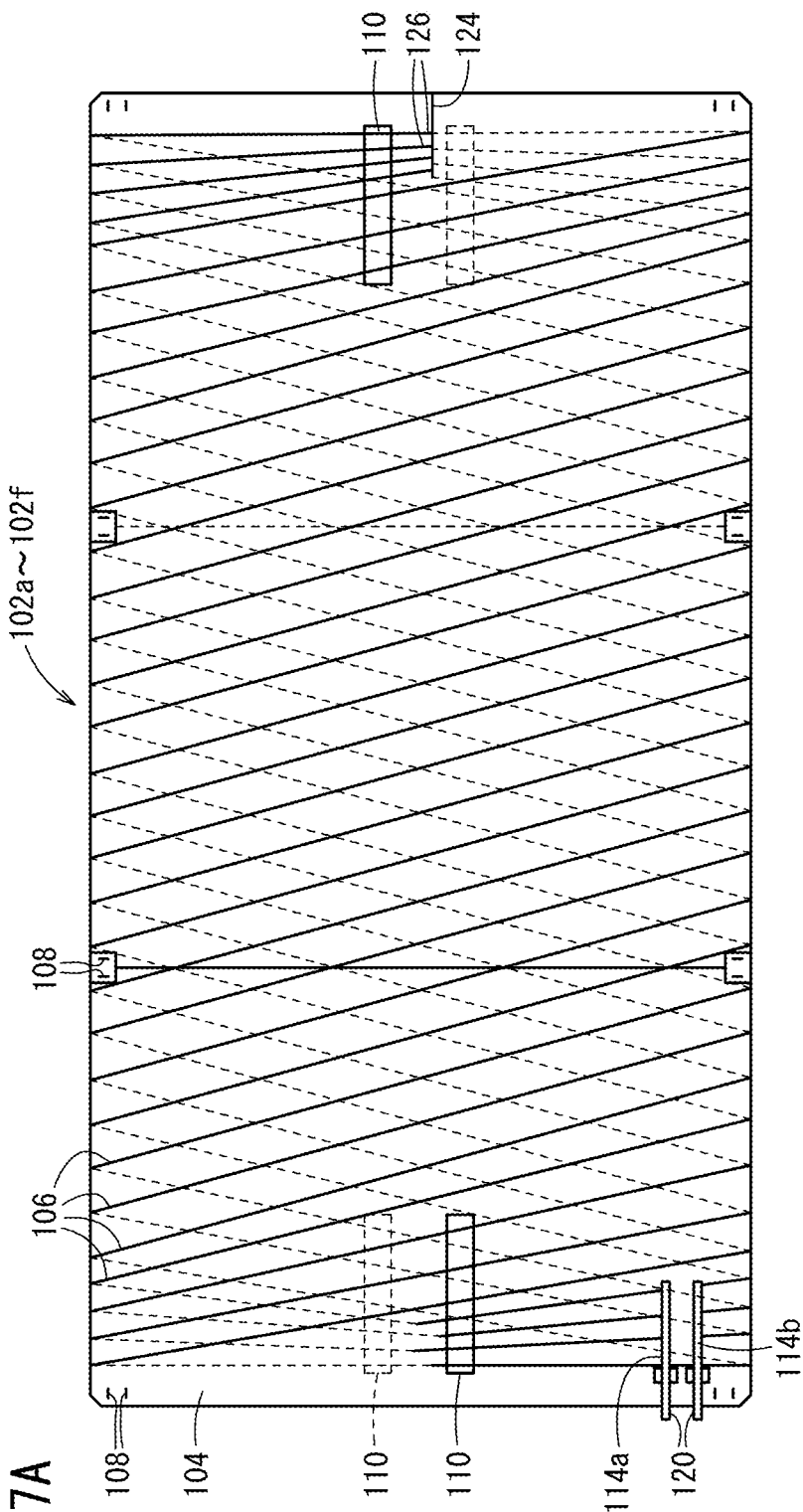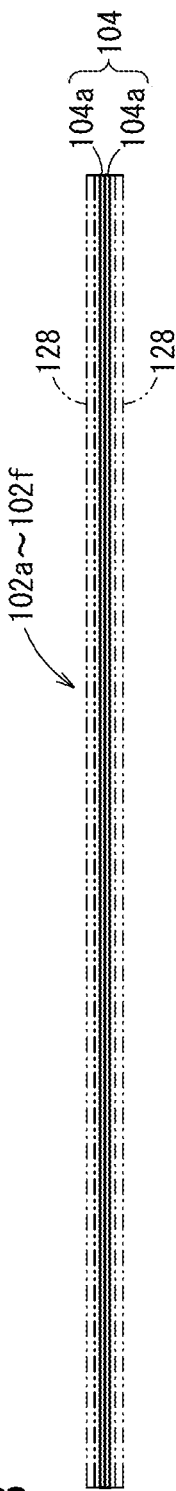
FIG. 7A
FIG. 7B

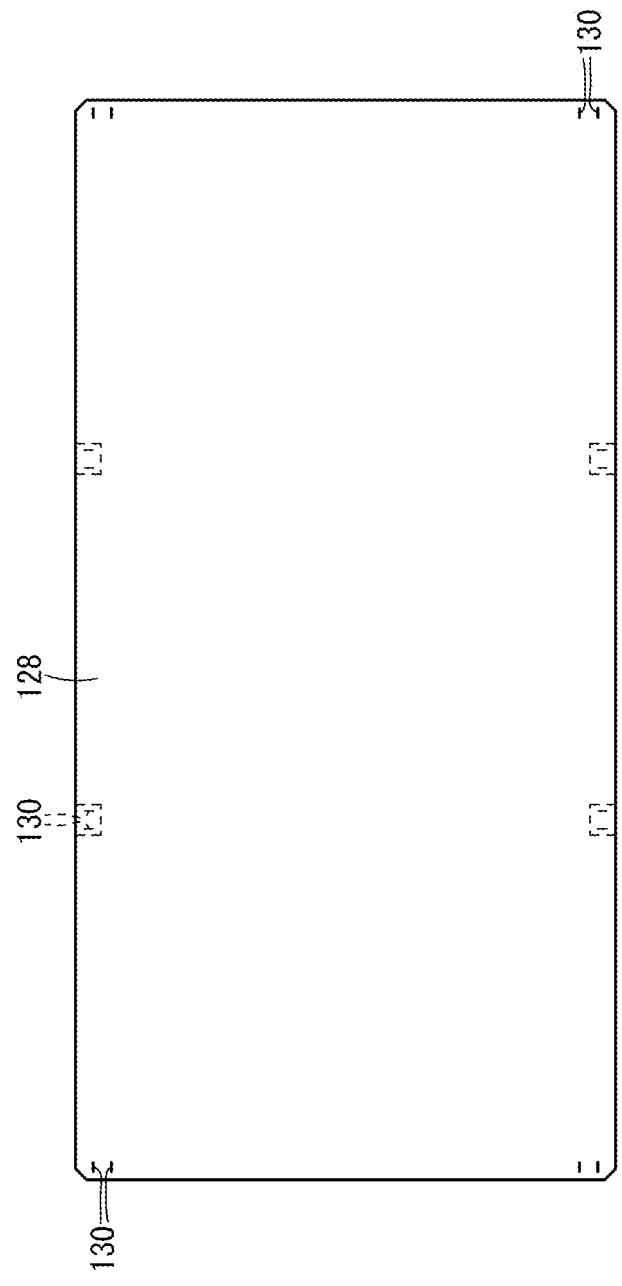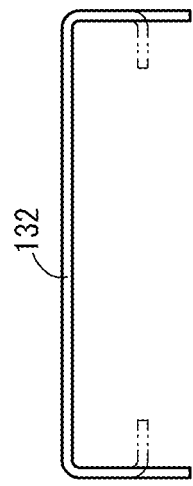
FIG. 11A
FIG. 11B

BATTERY-PACK CASE

CROSS-REFERENCE TO RELATED APPLICATIONS

This application is a Continuation of International Application No. PCT/JP2014/072371 filed on Aug. 27, 2014, which is based upon and claims the benefit of priority from Japanese Patent Application No. 2013-188268 filed on Sep. 11, 2013, the contents all of which are incorporated herein by reference.

TECHNICAL FIELD

The present invention relates to a battery assembly container (battery-pack case) for accommodating a battery assembly.

BACKGROUND ART

In general, a heat insulating container forming a battery assembly container of a sodium-sulfur battery (hereinafter referred to as the NaS battery) as a secondary battery operated at high temperature is made up of a container body having an opening opened at is upper position and a lid body fitted to the opening. A battery assembly formed by connecting a large number of battery cells in a predetermined arrangement pattern is accommodated in this heat insulating container. Electrodes pass through one end and the other end of the heat insulating container, and the electrodes are connected to both ends of the battery assembly.

Since this NaS battery is operated at about 300° C., it is required to heat the NaS battery up to this temperature. Further, it is required to maintain the temperature of the NaS battery at the operating temperature for charging and discharging of the battery. Moreover, it is required to ensure the uniform temperature distribution in the heat insulating container so that the battery cells exhibit the intended characteristics sufficiently. To this end, an electric heater is provided, e.g., at the bottom inside the heat insulating container. By this heater, the temperature in the heat insulating container is regulated (see Japanese Laid-Open Patent Publication No. 06-283215 and Japanese Laid-Open Patent Publication No. 08-078051).

SUMMARY OF INVENTION

In this regard, it is difficult to ensure the uniform temperature distribution in the heat insulating container using only one heater. Therefore, it may be considered to provide a plurality of heaters at the bottom, along inner walls, etc. in the heat insulating container to regulate the temperature in the heat insulating container.

In this case, it may be considered to connect power supplies to the plurality of heaters, respectively. However, this would result in the complicated wiring path, and impose limitations to the work efficiency of wiring operation. Further, it is required to consider the product life of electrically heating wires (heater wires) provided in the heater, and detect failures due to disconnection of the heater wires and disconnection of the heater wires due to failures of the battery cells at an early stage.

The present invention has been made taking such a problem into account, and an object of the present invention is to provide a battery assembly container which makes it possible to simplify the wiring path, improve the work efficiency of the wiring operation, extend the product life of heater wires, enable failures due to disconnection of the heater wires and disconnection of the heater wires due to failures of the battery cells to be detected at an early stage.

[1] The battery assembly container according to the present invention includes a box body having an opening in an upper surface of the box body and accommodating a battery assembly, a lid body configured to close the opening of the box body, and heater units for a plurality of systems provided in the box body. A plurality of heaters of a heater unit for at least one system, among the heater units for the plurality of systems, are connected in series.

In this manner, it becomes possible to reduce the number of power supplies for supplying electrical energy to the plurality of heaters. Therefore, the wiring path is simplified, and it is possible to improve the work efficiency of wiring operation. Since the electric current value flowing through the heaters is suppressed to a low level, the product life of the heaters can be extended. Further, even if only one of the plurality of heaters is disconnected, since the heater unit for the system including this heater does not function properly, it becomes difficult to maintain the temperature in the box body at a fixed temperature. Therefore, it becomes possible to detect a failure (leakage of active material, etc.) of the battery cell and other failures at an early stage, based on the decrease of the temperature in the box body.

[2] In the present invention, the heater units for the plurality of systems may include a first heater unit provided at a bottom of the box body and a second heater unit provided along a side wall of the box body. A plurality of heaters of at least one of the first heater unit and the second heater unit, may be connected in series.

[3] In this case, a plurality of heaters of the first heater unit may be connected in series, and a plurality of heaters of the second heater unit may be connected in series.

[4] In the present invention, each of a plurality of heaters of the heater units for the plurality of systems may include a heater wire provided in the box body, a positive side heater wiring line connected to a positive terminal of the heater wire, and a negative side heater wiring line connected to a negative terminal of the heater wire.

In this manner, it is not necessary to consider the wiring path for serial connection in the box body each time, the conventional box body can be utilized as it is without any change of design, and reduction of the cost for design changes, etc. can be achieved.

[5] In this case, in the heater unit including the plurality of heaters connected in series, among the heater units for the plurality of systems, the positive side heater wiring line of a heater positioned at one end of serial connection and the negative side heater wiring line of a heater positioned at another end of serial connection may be connected to a power supply.

[6] Further, a terminal frame may be provided outside the box body. The terminal frame may include a plurality of positive side connection terminals each connected to the positive side heater wiring lines, in correspondence with each of the heaters, a plurality of negative side connection terminals each connected to the negative side heater wiring lines, in correspondence with each of the heaters, and one or more jumper wires electrically connecting the positive side connection terminals and the negative side connection terminals corresponding respectively to the plurality of heaters connected in series.

Normally, each time the plurality of heaters connected in series are changed, it is required to build a new wiring path and perform wiring operation. However, in the present invention, simply by changing the connection position of the jumper wire connected to the terminal frame, the plurality of heaters connected in series can be selected arbitrarily. Therefore, it is not required to build a new wiring path and perform wiring operation. Accordingly, improvement in the work efficiency of wiring operation is achieved.

[7] In this case, the terminal frame may include a positive side power supply terminal connected to a positive terminal of a power supply and a negative side power supply terminal connected to a negative terminal of the power supply. The positive side connection terminal connected to the positive side heater wiring line of the heater positioned at one end of serial connection among the plurality of heaters connected in series and the positive side power supply terminal may be connected electrically, and the negative side connection terminal connected to the negative side heater wiring line of the heater positioned at another end of serial connection among the plurality of heaters connected in series and the negative side power supply terminal may be connected electrically.

As described above, in the battery assembly container according to the present invention, it is possible to simplify the wiring path, and improve the work efficiency of the wiring operation. Moreover, it is possible to extend the product life of heater wires, enable failures due to disconnection of the heater wires and disconnection of the heater wires due to failures of the battery cells to be detected at an early stage.

BRIEF DESCRIPTION OF DRAWINGS

FIG. 7A is a plan view showing a heater as viewed from above;

FIG. 7B is a front view showing the heater;

FIG. 11A is a plan view showing an insulating thin plate as viewed from above;

FIG. 11B is a front view showing a mounting metal fixture;

DESCRIPTION OF EMBODIMENTS

Hereinafter, an embodiment of a battery assembly container according to the present invention applied to, e.g., a NaS battery will be described with reference to FIGS. 1 to 14.

Figure 1:
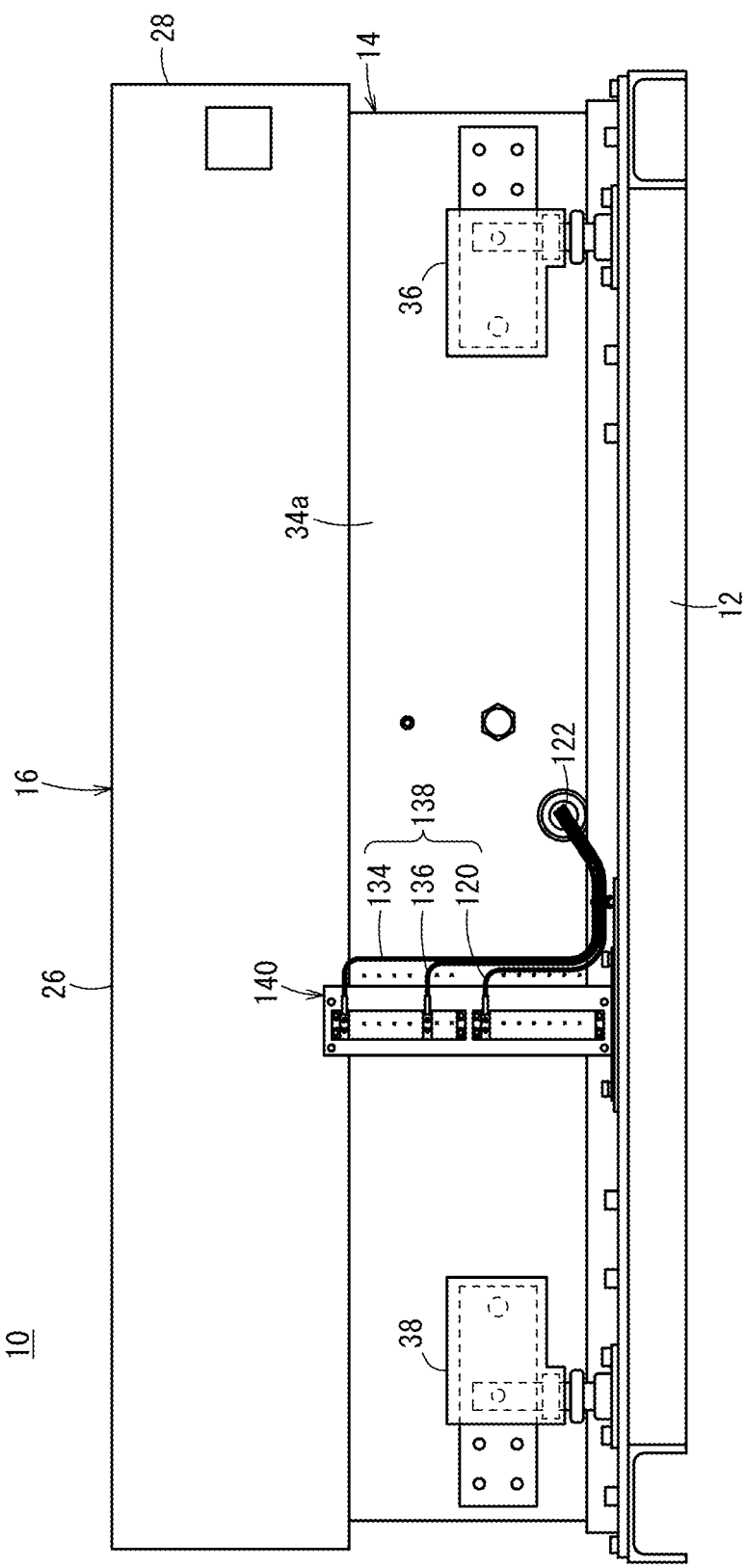
FIG. 1 is a front view showing a battery assembly container according to an embodiment of the present invention.

A battery assembly container 10 according to the embodiment of the present invention has a substantially rectangular shape as viewed from above. As shown in FIG. 1, the battery assembly container 10 includes a box body 14 of, e.g., a vacuum heat insulating design specification placed on a base frame 12 made of, e.g., steel material, and a lid body 16 of, e.g., an atmospheric air heat insulating design specification for closing an opening of the box body 14.

Figure 2:
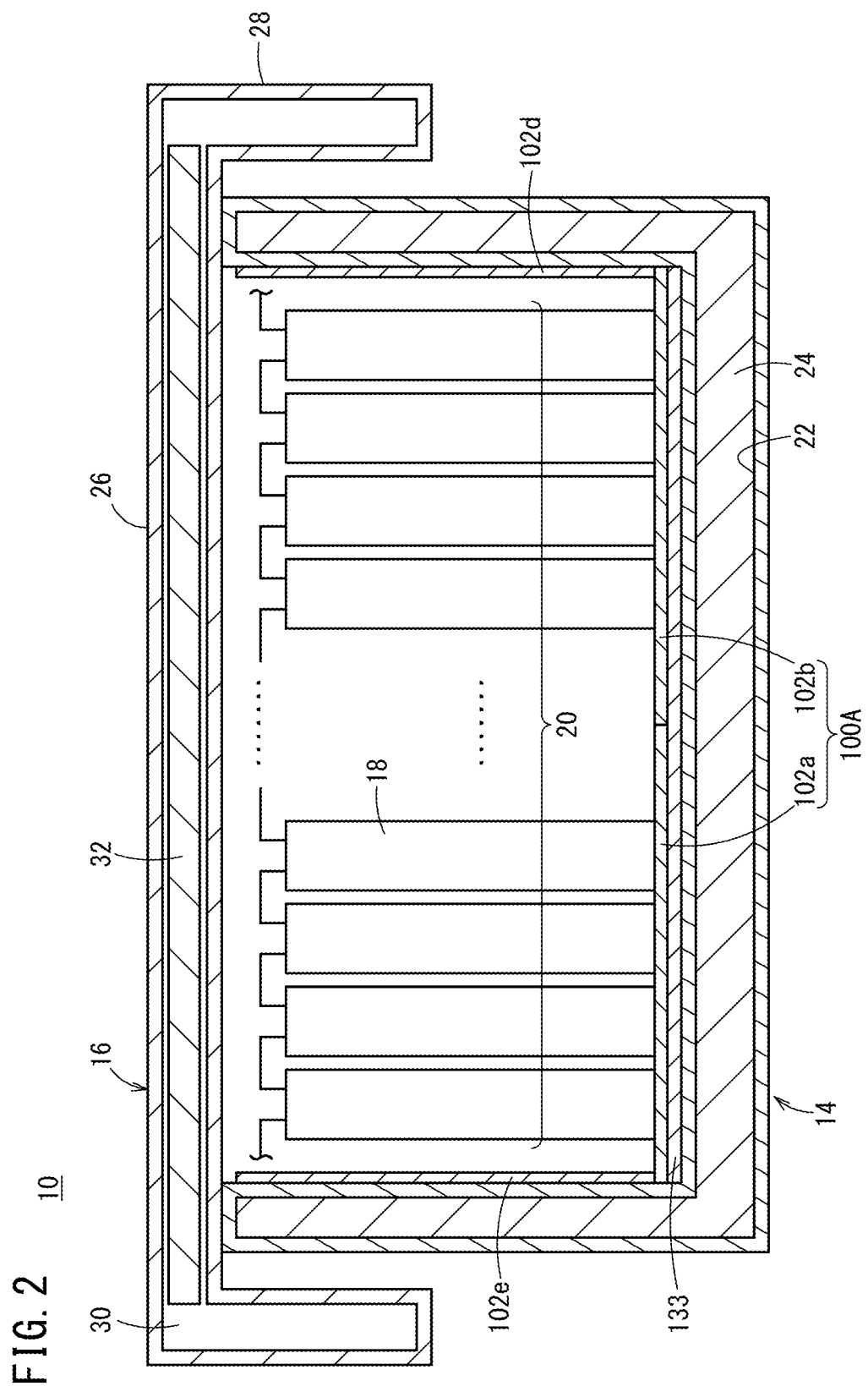
FIG. 2 is a vertical cross sectional view showing the battery assembly container with partial omission.

As shown in FIG. 2, a battery assembly 20 made up of a large number of battery cells 18 is placed in the box body 14. For example, each of the battery cells 18 has a cylindrical shape, and is accommodated in the box body 14 in a state where the axial direction of the battery cells 18 is oriented vertically. Further, in order to suppress damages and abnormal heating of the battery cells 18 or leakage of active material, etc., though not shown, as fire extinction sand, silica sand is filled in a gap between the box body 14 and the battery assembly 20.

For example, the box body 14 has a substantially rectangular parallelepiped shape, and includes four side walls and a bottom wall. An opening is formed in an upper surface of the box body 14. For example, the box body 14 is made of plate material of stainless steel. The box body 14 is formed in a box shape having a hollow area 22. The hollow area 22 is a hermetical space which is sealed in an air-tight manner. The hollow area 22 is connectable to the external space by a vacuum valve (not shown). A porous vacuum heat insulating board 24 formed by solidifying glass fiber into a plate shape using adhesive is loaded in the hollow area 22 to achieve vacuum heat insulating structure of the box body 14.

The lid body 16 includes a ceiling wall 26 and eaves 28, and provided to close the opening in the upper surface of the box body 14. In the same manner as in the case of the box body 14, the lid body 16 is made of plate material of stainless steel. A heat insulating material layer (not shown) for achieving the required minimum heat insulating property is placed under an inner surface (lower surface) of the lid body 16. At least two stacked detachable heat insulating plates 32 are filled (stacked) in a hollow area 30 to provide air heat insulating structure only in the lid body 16 (upper surface) of the battery assembly container 10. In the structure, the quantity of heat radiation from the upper surface of the battery assembly container 10 can be regulated. In the case where the heat insulating performance in the battery assembly 20 is important, the lid body 16 may adopt vacuum heat insulating structure as in the case of the box body 14.

Further, as shown in FIG. 1, among the four side walls, an outer surface (one outer side surface) of a first side wall 34a as a front surface is equipped with a positive electrode bus bar 36 of a positive electrode external terminal and a negative electrode bus bar 38 of a negative electrode external terminal.

Figure 3:
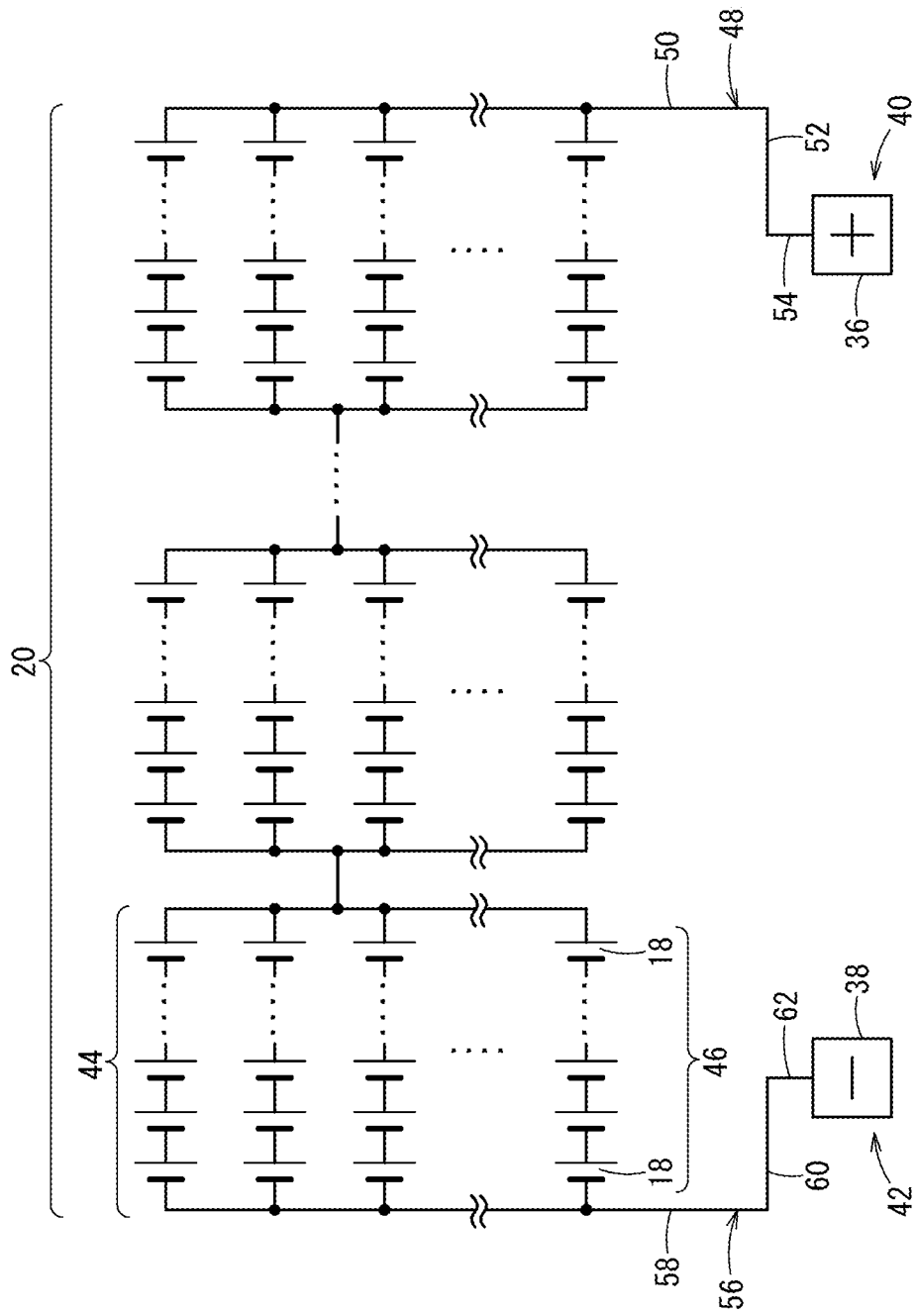
FIG. 3 is an equivalent circuit diagram showing a battery assembly contained in the battery assembly container.

As shown in FIG. 3, the battery assembly 20 is formed by connecting two or more blocks 44 in series from a positive electrode 40 to a negative electrode 42. Each of the blocks 44 is formed by connecting two or more circuits (strings 46) in parallel, and each of the strings 46 is formed by connecting two or more of battery cells 18 in series.

The positive electrode 40 includes the positive electrode bus bar 36 of the positive electrode external terminal and a positive electrode bus 48 as a relay member. The positive electrode bus 48 includes a positive electrode current collector 50, a positive electrode extension 52, and a positive electrode pole 54. The negative electrode 42 includes the negative electrode bus bar 38 of the negative electrode external terminal and a negative electrode bus 56 as a relay member. The negative electrode bus 56 includes a negative electrode current collector 58, a negative electrode extension 60, and a negative electrode pole 62.

Next, an example of specific structure of the positive electrode 40 and the negative electrode 42 will be described with reference to FIGS. 4 and 5.

Figure 4:
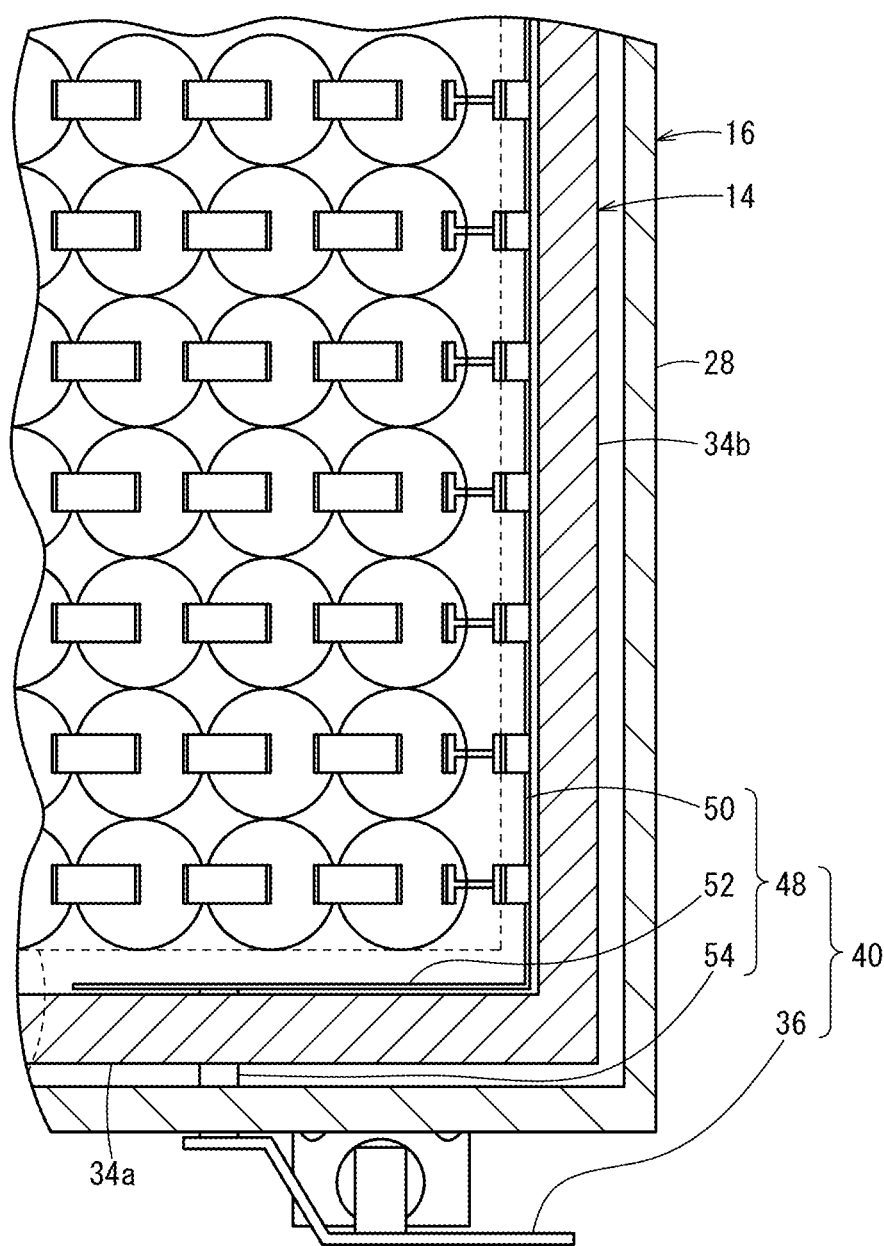
FIG. 4 is a lateral sectional view showing a part (positive electrode side) of the battery assembly container.

As shown in FIG. 4, the positive electrode current collector 50 and the positive electrode extension 52 of the positive electrode 40 are accommodated in an accommodation space of the box body 14. The positive electrode pole 54 extends through the first side wall 34*a*. The positive electrode current collector 50 and the positive electrode extension 52 are formed by bending an intermediate portion of one electrically conductive material (e.g., metal plate) at a right angle. The positive electrode current collector 50 is provided along an inner surface of a second side wall 34*b*. The positive electrode extension 52 is provided along an inner surface of the first side wall 34*a*. The positive electrode pole 54 is joined to the positive electrode extension 52 in the accommodation space of the box body 14, and joined to the positive electrode bus bar 36 outside the box body 14.

Figure 5:
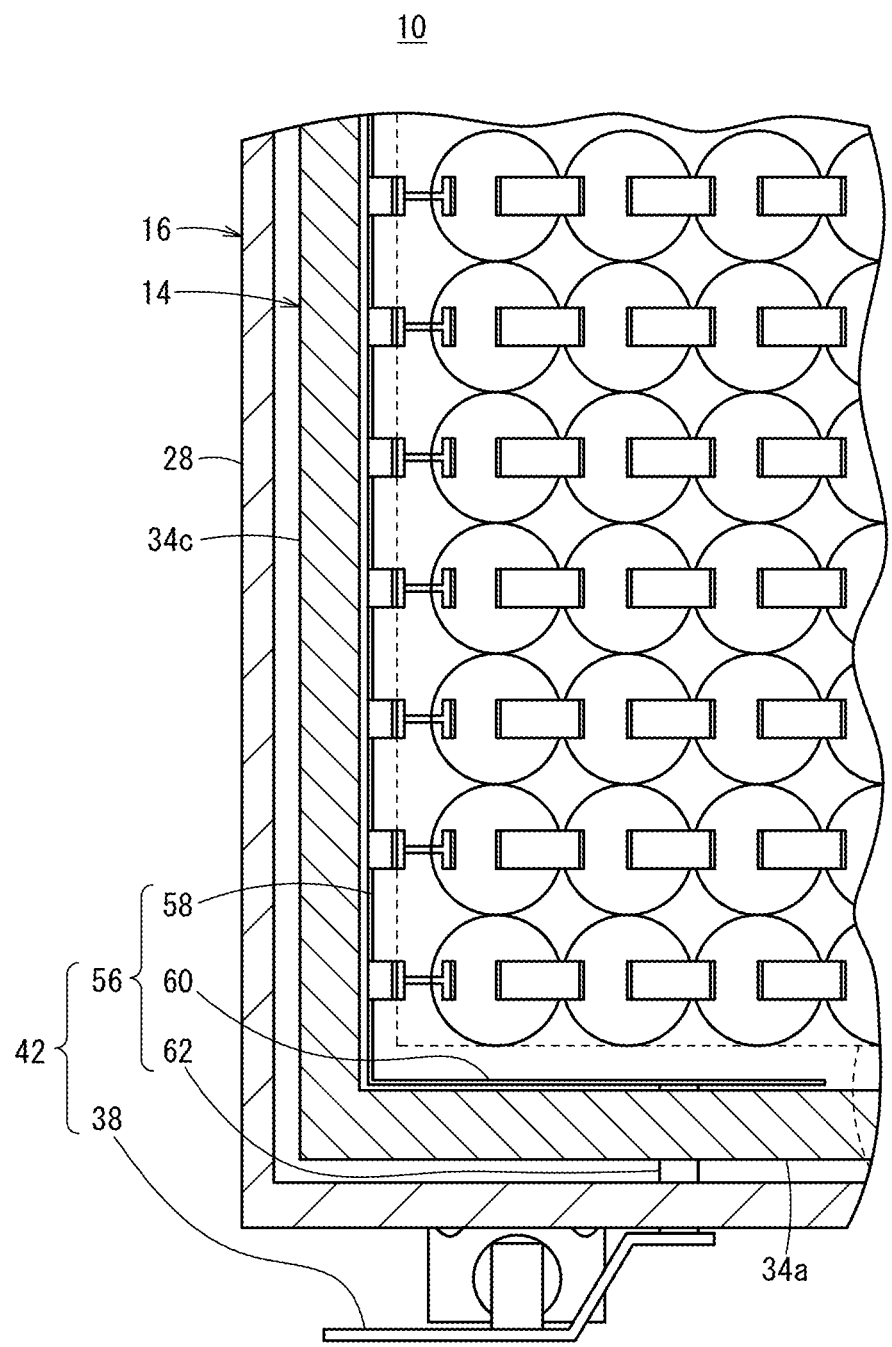
FIG. 5 is a lateral cross sectional view showing a part (negative electrode side) of the battery assembly container.

As shown in FIG. 5, the negative electrode current collector 58 and the negative electrode extension 60 are accommodated in the accommodation space. The negative electrode pole 62 extends through the first side wall 34*a*. The negative electrode current collector 58 and the negative electrode extension 60 are formed by bending an intermediate portion of one electrically conductive material (e.g., metal plate) at a right angle. The negative electrode current collector 58 is provided along an inner surface of a third side wall 34*c*. The negative electrode extension 60 is provided along an inner surface of the first side wall 34*a*.

The negative electrode pole 62 is joined to the negative electrode extension 60 in the accommodation space, and joined to the negative electrode bus bar 38 outside the box body 14.

It should be noted that since the above described positive electrode current collector 50, the positive electrode extension 52, the negative electrode current collector 58, and the negative electrode extension 60 are made of metal plates, this structure contributes to the reduction in electric resistance of the positive electrode bus 48 and the negative electrode bus 56. It is a matter of course that each of the positive electrode current collector 50 and the positive electrode extension 52, and the negative electrode current collector 58 and the negative electrode extension 60 may be formed by joining two or more electrically conductive parts or components. Further, since each of the positive electrode pole 54 and the negative electrode pole 62 has a pole shape, this structure contribute to suppression of movement of the heat into, and out of the box body 14 through the positive electrode pole 54 and the negative electrode pole 62.

Figure 6:
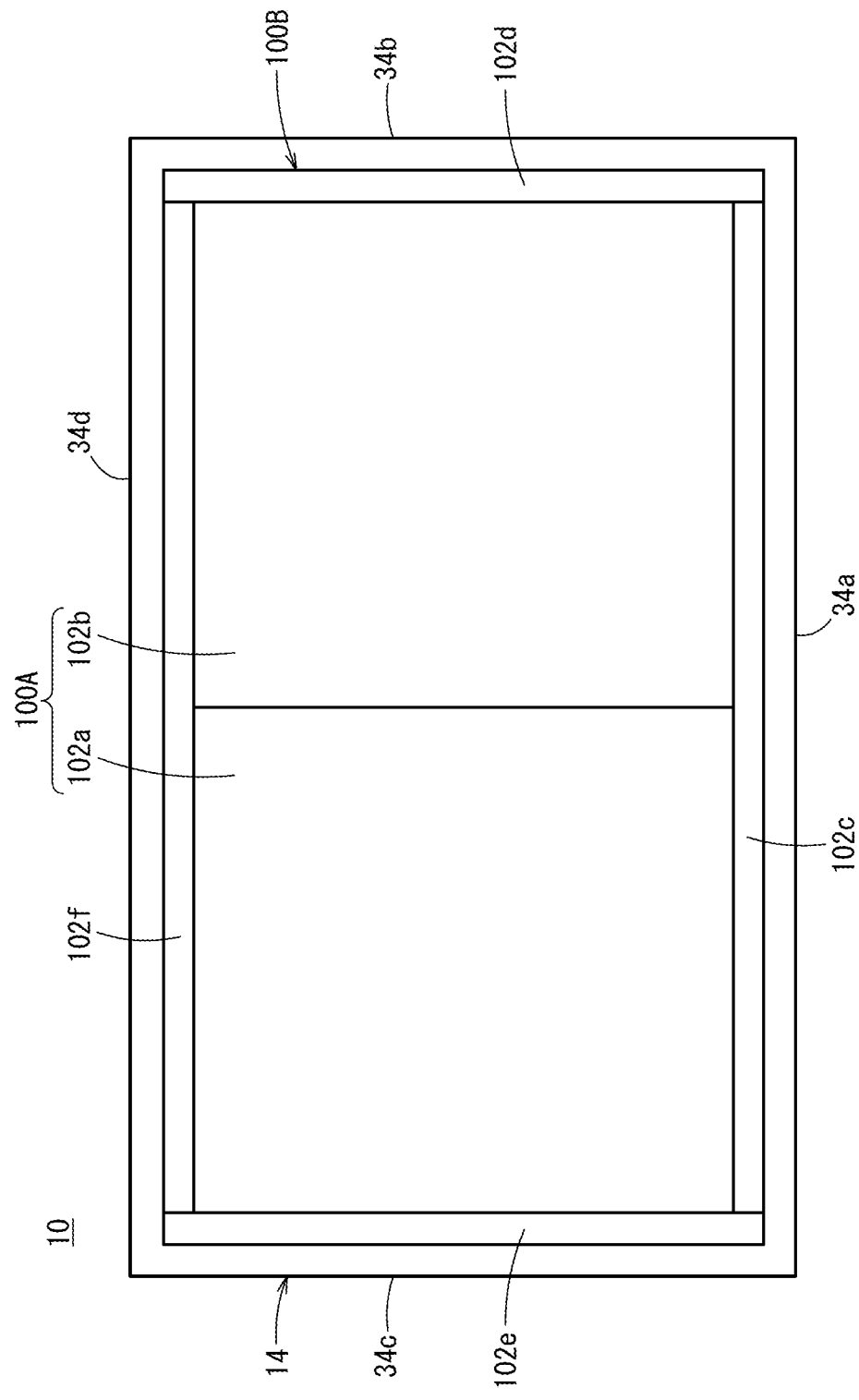
FIG. 6 is a plan view showing the inside of a box body as viewed from above, in a state where a lid body is removed from the box body.

Further, as shown in FIG. 6, heater units 100 for a plurality of systems are provided in the box body 14. Specifically, the heater units 100 for the plurality of systems include a first heater unit 100A (see FIG. 2) provided at the bottom of the box body 14, and a second heater unit 100B provided along the side walls (the first side wall 34*a* to a fourth side wall 34*d*) of the box body 14. It should be noted that FIG. 6 is a plan view showing the inside of the box body 14 as viewed from above, in a state where the lid body 16 is removed from the box body 14, and notations of other components (battery assembly 20, etc.) provided in the box body 14 are omitted for ease of understanding positions of the first heater unit 100A and the second heater unit 100B.

The first heater unit 100A includes two heaters (a first heater 102*a* and a second heater 102*b*) provided in parallel to each other at the bottom of the box body 14. The second heater unit 100B includes a third heater 102*c* provided along the first side wall 34*a* of the box body, a fourth heater 102*d* provided along the second side wall 34*b*, a fifth heater 102*e* provided along the third side wall 34*c*, and a sixth heater 102*f* provided along the fourth side wall 34*d*.

As shown in FIG. 7A, each of the first heater 102*a* to the sixth heater 102*f* is formed by winding four heater wires (Nichrome wires or iron chromium wires) 106 widthwise spirally around the outer circumferential surface of a core member 104 made of an insulating plate. This core member 104 is made of thin mica. Mount holes 108 are formed at a plurality of positions of the marginal portion of the core member 104. As shown in FIG. 7B, in this embodiment, the core member 104 is formed by stacking two insulating plates 104*a*, 104*b* together.

Each of the heaters 102*a* to 102*f* is thin and has a wide area. Therefore, space can be utilized effectively. Further, the heaters 102*a* to 102*f* have good heating efficiency and excellent insulating property. Even if one of the four heater wires 106 is disconnected, heating can be continued by the remaining three heater wires 106, and thus, the secondary battery can continue its operation without any failures.

The heater wires 106 are wound around the core member 104. In this regard, for example, if the box body 14 has, e.g., a rectangular shape as viewed from above, since the quantity of heat radiation at both ends in the longitudinal direction is large, the heater wires 106 may be wound densely at both ends of the core member 104 in the longitudinal direction, and coarsely at an intermediate position of the core member 104 in the longitudinal direction. In this case, since the increase in the temperature is large at both ends, the quantity of heat radiated from the heaters 102*a* to 102*f* is increased toward both ends of the box body 14. Consequently, it is possible to achieve more uniform temperature inside the box body 14.

It is a matter of course that it is possible to reduce the winding pitch in the portion where the heater wires 106 are wound around the core member 104 coarsely. By reducing the winding pitch, the overall length of the heater wires 106 is increased, and the electrical resistance value is increased. Therefore, it is possible to decrease the current value of the electric current flowing through the heater wires 106, and suppress disconnection of the heater wires 106. Further, by reducing the winding pitch in the portion where the heater wires 106 are wound around the core member 104 coarsely, since distribution of the heat radiated from the heaters 102*a* to 102*f* becomes more uniform, it is possible to achieve more uniform temperature inside the box body 14. In particular, if the winding pitch of the heater wires 106 having a value close to the diameter of the battery cell 18 is adopted, when a failure of the battery cell 18 occurs, the heater wires 106 are affected by the failure easily. Therefore, it becomes possible to detect the failure of the battery cell 18 at an early stage.

Figure 8A:
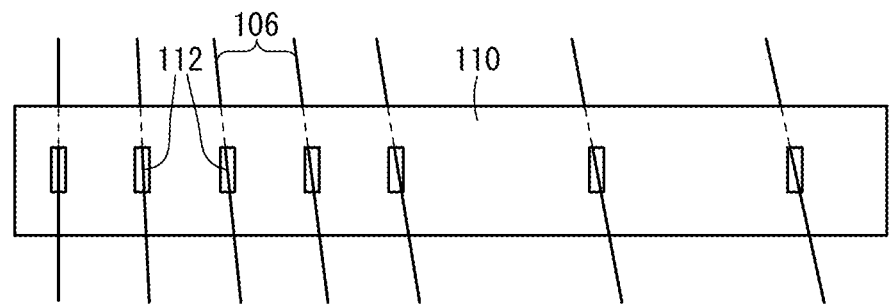
FIG. 8A is a plan view showing a state where heater wires are inserted into insertion holes of an insulating interval holding plate as viewed from above.
Figure 9A:
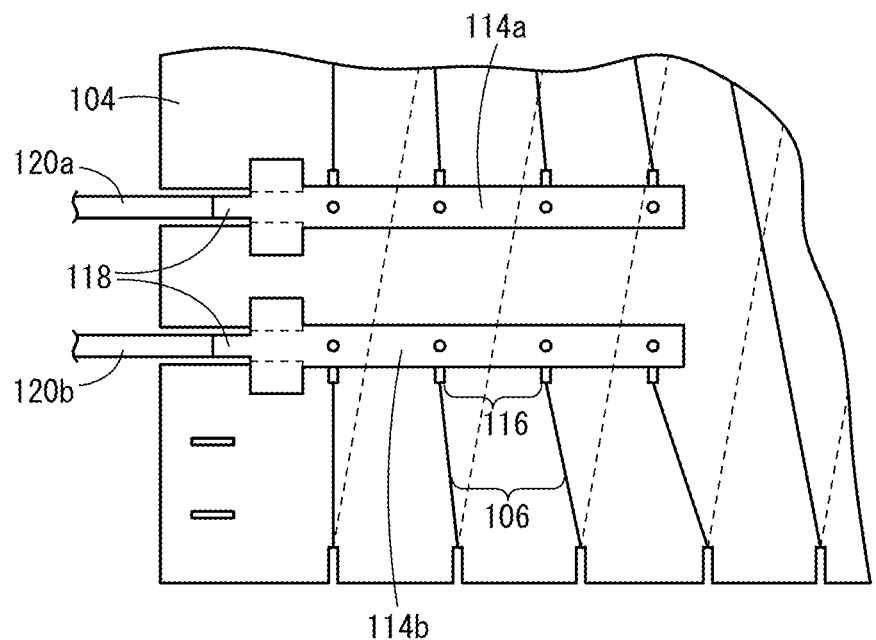
FIG. 9A is a plan view showing a state where the heater wires are connected to a terminal plate, as viewed from above.
Figure 9B:
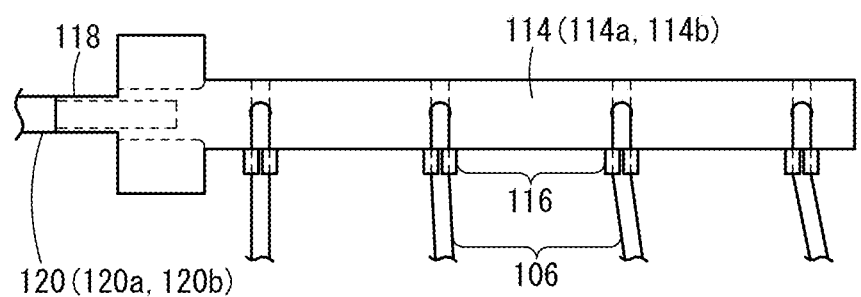
FIG. 9B is a plan view in which a portion in FIG. 9A is enlarged.
Figure 10A:
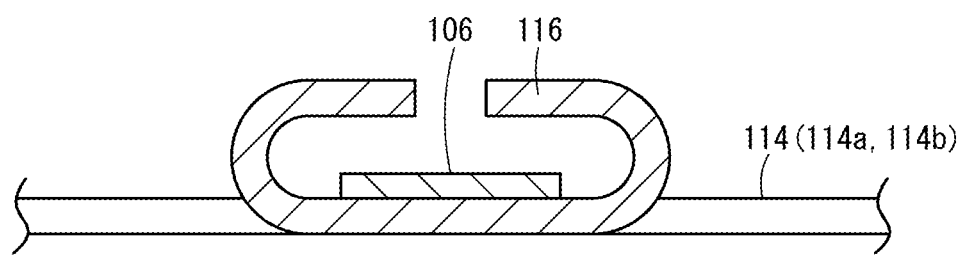
FIG. 10A is a cross sectional view showing a portion of fastening a heater wire by crimping.
Figure 10B:
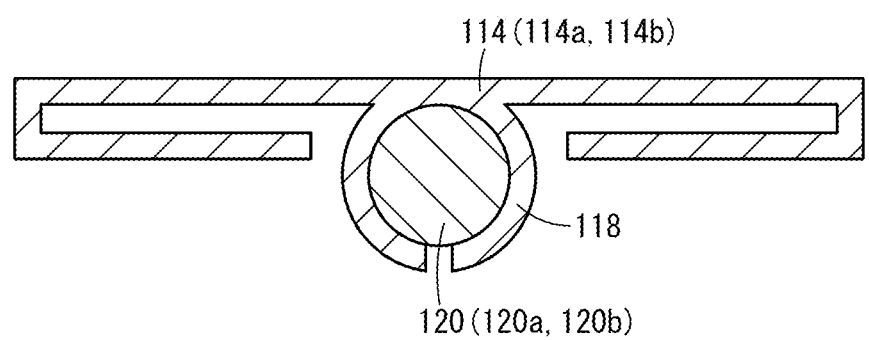
FIG. 10B is a cross sectional view showing a state where a heater wiring line is fastened to a crimping section of the terminal plate by crimping.

As shown in FIG. 8A, an insulating interval holding plate 110 has a plurality of insertion holes 112 positioned at fixed intervals. The heater wires 106 are inserted into the respective insertion holes 112 to prevent positional displacement of the heater wires 106, and thus, the heater wires 106 are kept insulated from one another. As shown in FIG. 7A, a pair of terminal plates 114 (a positive (+) terminal 114a and a negative (−) terminal 114b) are fastened to the core member 104, and as shown in FIG. 9A, FIG. 9B, and FIG. 10A, fastening sections 116 each bent in a circular arc shape are formed at four side positions. After the ends of the heater wires 106 are fastened to the fastening sections 116 by crimping, the ends of the heater wires 106 are fixed to the terminal plate 114 by welding.

Figure 8B:
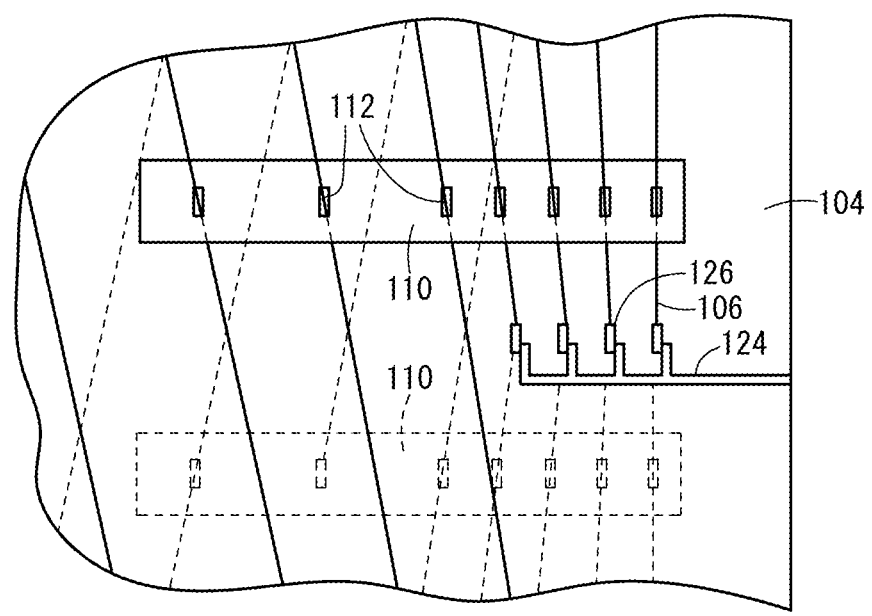
FIG. 8B is a plan view showing a state where a heater wire is supported by a support hole, as viewed from above.

As shown in FIG. 9A and FIG. 9B, crimping sections 118 are formed at front ends of the terminal plates 114. Each of the crimping sections 118 is formed in a circular arc shape at the outer end of each terminal plate 114. Ends of heater wiring lines 120 (a positive (+) side heater wiring line 120a and a negative (−) side heater wiring line 120b) are inserted into the crimping sections 118, and welded to join the heater wiring lines 120 to the terminal plates 114. The heater wiring line 120 extends to the outside from an insertion hole 122 (hole for inserting a plurality of wiring lines in the hermetical, air-tight state) shown in FIG. 1. As shown in FIG. 8B, a support hole 124 for supporting the heater wires 106 is formed at one end of the core member 104, and engagement portions 126 having holes are formed at side positions of the support hole 124. The four heater wires 106 are engaged with these engagement portions 126. The heater wires 106 pass through the core member 104 from the front side to the back side to change the orientation of the heater wires 106. The insulating interval holding plate 110 is also provided on the part of the wall on the other side of the core member 104 to prevent contact between the heater wires 106 due to positional displacement of the heater wires 106, and insulation is maintained.

As shown in FIG. 7B, two insulating thin plates 128 (denoted by two dot chain lines) are stacked on each of both surfaces of the core member 104 to achieve the insulating property required for prevention of ground fault (earth fault), which would otherwise result from leakage of active material of the battery cell 18. As shown in FIG. 11A, the insulating thin plate 128 is formed in a shape corresponding to the shape of the core member 104, and a plurality of mount holes 130 are perforated along the marginal portion of the thin plate 128. Further, insulating thin plates 128 are provided on both surfaces of the core member 104, and both ends of mounting metal fixture 132 having a U-shape shown in FIG. 11B are inserted into the thin plates 128 and the mount holes 108 of the core member 104, and the front ends of the mounting metal fixture 132 are bent as shown by the two dot chain lines in FIG. 11B. In this manner, components are joined together.

Further, for example, as shown in FIG. 2, a thin aluminum heat equalizing plate 133 is provided on the first heater 102a and the second heater 102b of the first heater unit 100A. In the structure, the heat generated by these heaters is transmitted to the ends of the box body 14, and heat is distributed uniformly in both of the ends and the intermediate portion. Further, the heat in the intermediate portion generated during battery operation is transmitted to the ends, and released. As shown in FIG. 6, the third heater 102c to the sixth heater 102f provided along the four side walls of the box body 14 assist heating of the inside of the box body 14 from the side surfaces of the box body 14. Therefore, the temperature in the battery assembly container 10 is increased promptly, and uniform temperature distribution is achieved.

Further, in the box body 14, in addition to the above described battery assembly 20 and the first heater 102a to the sixth heater 102f, though not shown, a plurality of thermometers for measuring the temperature in the box body 14, and a plurality of voltage meter for measuring the block voltage, etc. are provided. Therefore, as shown in FIG. 1, a plurality of wiring lines 138 including a plurality of heater wiring lines 120 for supplying electrical energy to the first heater 102a to the sixth heater 102f, a plurality of signal lines 134 from various voltage meters, and a plurality of signal lines 136 from various thermometers, are provided inside and outside the battery assembly container 10.

In this case, since a large number of wiring lines are present, it is preferable that these wiring lines are provided locally at one position, and types of the wiring lines can be identified easily. To this end, in the embodiment of the present invention, as shown in FIG. 1, a terminal frame 140 connected to the plurality of wiring lines 138 is provided between the positive electrode bus bar 36 and the negative electrode bus bar 38 in the base frame 12. Further, means for inserting the plurality of wiring lines 138 is provided between the terminal frame 140 and one of the positive electrode bus bar 36 and the negative electrode bus bar 38 (in the example of FIG. 1, the positive electrode bus bar 36), in particular, the insertion hole 122 for inserting the plurality of wiring lines 138 in the hermetical, air tight state is provided.

Next, the wiring patterns of the first heater unit 100A and the second heater unit 100B shown in FIG. 6 will be described with reference to FIGS. 12 to 14.

Figure 12:
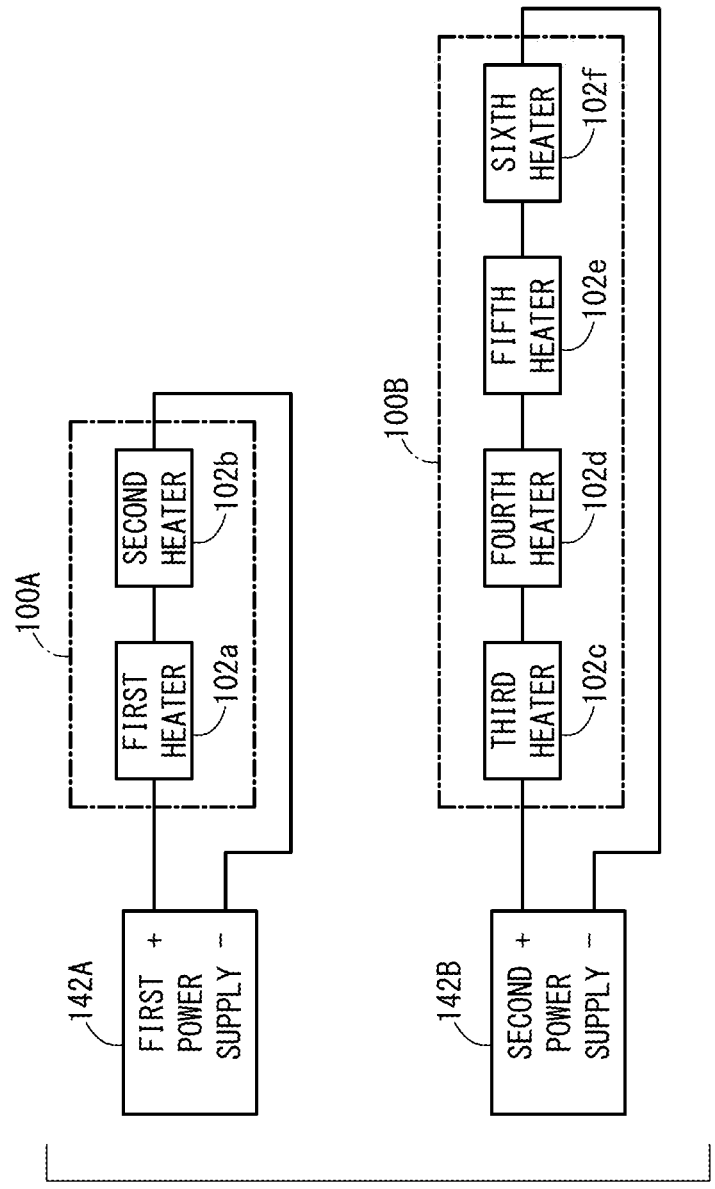
FIG. 12 is an equivalent circuit diagram showing wiring patterns of a first heater unit and a second heater unit.

In the embodiment of the present invention, as shown in FIG. 12, the first heater 102a and the second heater 102b of the first heater unit 100A are connected in series between the positive (+) terminal and the negative (−) terminal of a first power supply 142A. Likewise, the third heater 102c to the sixth heater 102f of the second heater unit 100B are connected in series between the positive (+) terminal and the negative (−) terminal of a second power supply 142B.

Figure 13:
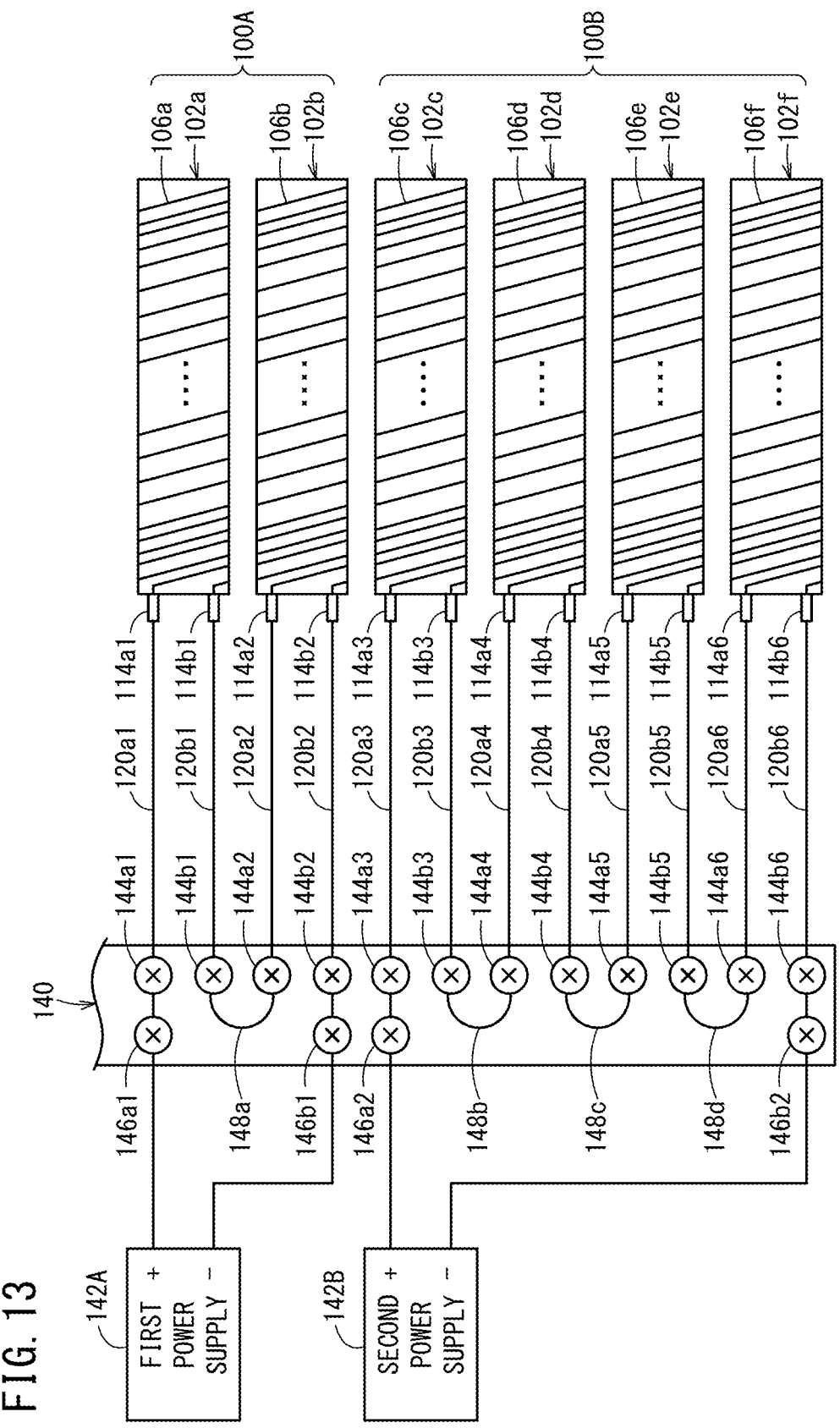
FIG. 13 is a diagram showing the connection relationship between heater wiring lines from first to sixth heaters, and connection terminals, power supply terminals, and jumper wires of a terminal frame.

Specifically, firstly, as shown in FIG. 13, in the first heater 102a, a first positive (+) side heater wiring line 120a1 is connected to a positive (+) terminal 114a1, which is connected to one end of a first heater wire 106a, and a first negative (−) side heater wiring line 120b1 is connected to a negative (−) terminal 114b1, which is connected to the other end of the first heater wire 106a. Likewise, also in each of the second heater 102b to the sixth heater 102f, positive (+) side heater wiring lines (a second positive (+) side heater wiring line 120a2 to a sixth positive (+) side heater wiring line 120a6) are connected to the positive (+) terminals 114a2 to 114a6, which are connected to ends of the heater wires (a second heater wire 106b to a sixth heater wire 106f), and negative (−) side heater wiring lines (a second negative (−) side heater wiring line 120b2 to a sixth negative (−) side heater wiring line 120b6) are connected to the negative (−) terminals 114b2 to 114b6, which are connected to other ends of the heater wires (the second heater wire 106b to the sixth heater wire 106f).

In corresponding with the first heater 102a to the sixth heater 102f, the terminal frame 140 has six positive (+) side connection terminals (a first positive (+) side connection terminal 144a1 to a sixth positive (+) side connection terminal 144a6), which are connected respectively to the first positive (+) side heater wiring line 120a1 to the sixth positive (+) side heater wiring line 120a6, and six negative (−) side connection terminals (a first negative (−) side connection terminal 144b1 to a sixth negative (−) side connection terminal 144b6), which are connected respectively to the first negative (−) side heater wiring line 120b1 to the sixth negative (−) side heater wiring line 120b6.

Further, the terminal frame 140 has a first positive (+) side power supply terminal 146a1 connected to the positive (+) terminal of the first power supply 142A for the first heater unit 100A, a first negative (−) side power supply terminal 146b1 connected to the negative (−) terminal of the first power supply 142A, a second positive (+) side power supply terminal 146a2 connected to the positive (+) terminal of the second power supply 142B for the second heater unit 100B, and a second negative (−) side power supply terminal 146b2 connected to the negative (−) terminal of the second power supply 142B.

Further, the terminal frame 140 has a first jumper wire 148a for connecting the first heater 102a and the second heater 102b in series, a second jumper wire 148b for connecting the third heater 102c and the fourth heater 102d in series, a third jumper wire 148c for connecting the fourth heater 102d and the fifth heater 102e in series, and a fourth jumper wire 148d for connecting the fifth heater 102e and the sixth heater 102f in series. That is, the first heater 102a and the second heater 102b of the first heater unit 100A are connected in series by the first jumper wire 148a, and the third heater 102c to the sixth heater 102f of the second heater unit 100B are connected in series by the second jumper wire 148b to the fourth jumper wire 148d.

Further, in the terminal frame 140, the first positive (+) side connection terminal 144a1 connected to the first positive (+) side heater wiring line 120a1 of a heater (e.g., the first heater 102a) positioned at one end of serial connection among the first heater 102a and the second heater 102b of the first heater unit 100A connected in series, and the first positive (+) side power supply terminal 146a1 are connected electrically. Further, the second negative (−) side connection terminal 144b2 connected to the second negative (−) side heater wiring 120b2 of a heater (e.g., the second heater 102b) positioned at the other end of serial connection, and the first negative (−) side power supply terminal 146b1 are connected electrically.

Likewise, for example, the third positive (+) side connection terminal 144a3 connected to the third positive (+) side heater wiring line 120a3 of, e.g., the third heater 102c among the third heater 102c to the sixth heater 102f of the second heater unit 100B connected in series, and the second positive (+) side power supply terminal 146a2 are connected electrically, and the sixth negative (−) side connection terminal 144b6 connected to the sixth negative (−) side heater wiring line 120b6 of the sixth heater 102f, and the second negative (−) side power supply terminal 146b2 are connected electrically.

As described above, in the embodiment of the present invention, the first heater 102a and the second heater 102b of the first heater unit 100A are connected in series, and the third heater 102c to the sixth heater 102f of the second heater unit 100B are connected in series.

Next, advantages of the embodiment of the present invention will be described by comparison with a comparative example shown in FIG. 14.

Figure 14:
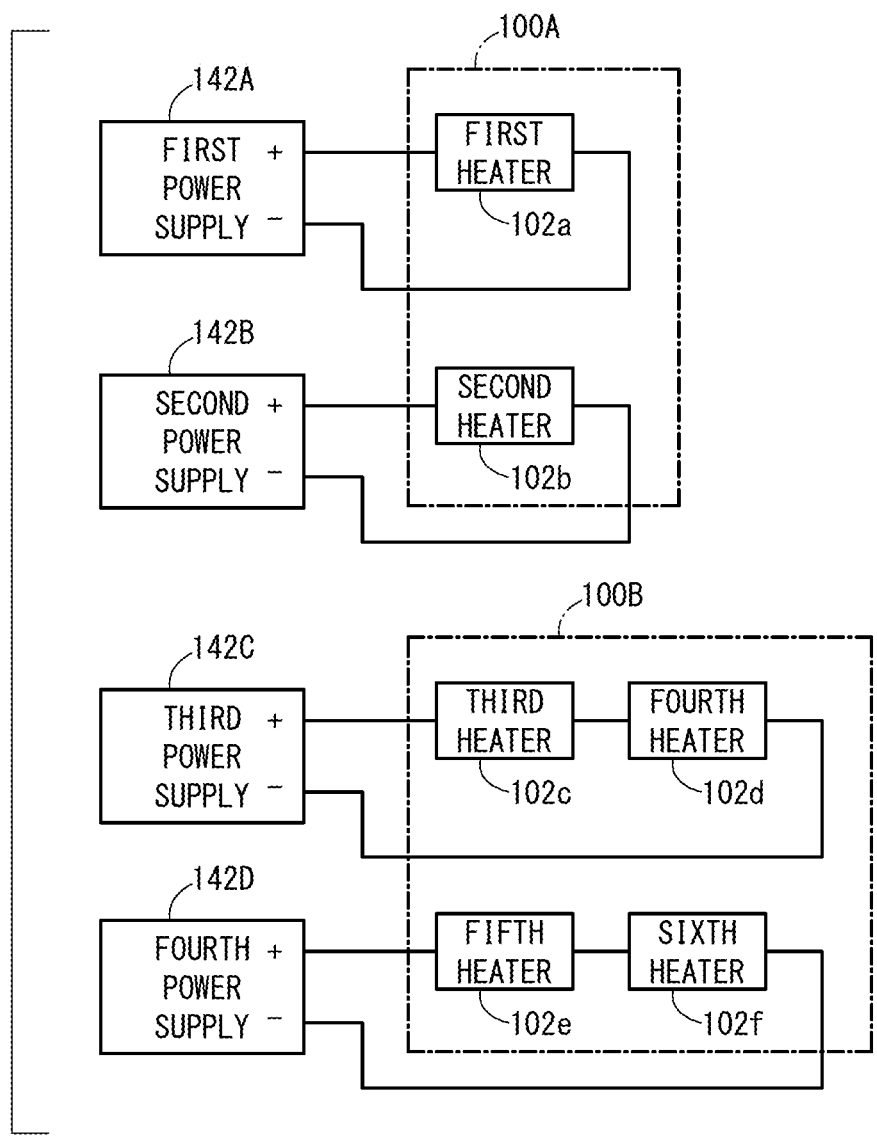
FIG. 14 is an equivalent circuit diagram showing wiring patterns of a first heater unit and a second heater unit in a comparative example.

In the wiring pattern of the comparative example, as shown in FIG. 14, power supplies (first power supply 142A and second power supply 142B) are connected respectively to a first heater 102a and a second heater 102b of a first heater unit 100A. Likewise, a third heater 102c and a fourth heater 102d of a second heater unit 100B are connected in series to a power supply (third power supply 142C), and a fifth heater 102e and a sixth heater 102f of the second heater unit 100B are connected in series to a power supply (fourth power supply 142D).

For example, it is assumed that the power supply capacity is 3200 W, and 800 W is supplied to each of the first heater 102a and the second heater 102b, 400 W is supplied to each of the third heater 102c and the fourth heater 102d, and 400 W is supplied to each of the fifth heater 102e and the sixth heater 102f. At this time, by setting the power supply voltage of each of the first power supply 142A to the fourth power supply 142D to 200 V, electrical current of 4 A flows through each of the first heater 102a to the sixth heater 102f.

In contrast, in the embodiment of the present invention, the number of power supplies can be reduced. In the example of FIG. 12, it is sufficient to provide the first power supply 142A and the second power supply 142B. Therefore, the wiring path is simplified, and improvement in the work efficiency of wiring operation is achieved.

Further, since the power supply voltage of the first power supply 142A is set to 400 V to apply the voltage of 200 V to each of the first heater 102a and the second heater 102b, electrical current of only 2A flows through the first heater 102a and the second heater 102b. Further, since the power supply voltage of the second power supply 142B is set to 400 V to apply the voltage of 100 V to each of the third heater 102c to the sixth heater 102f, electrical current of only 2A flows through the third heater 102c to the sixth heater 102f. Since the electric current value is suppressed at a low level, the product life of the first heater wire 106a to the sixth heater wire 106f provided for the first heater 102a to the sixth heater 102f can be extended.

In this regard, for example, in the case where disconnection occurs, e.g., in the heater wire (first heater wire 106a) of the first heater 102a due to a failure (leakage of active material, etc.) of the battery cell 18 or for some other reasons, in the comparative example, only the first heater 102a does not function properly, and the other heaters, i.e., the second heater 102b to the sixth heater 102f function normally. Therefore, in the case where a feedback control scheme for maintaining the temperature inside the box body 14 at a fixed temperature based on information from a thermometer is adopted, by increasing the quantity of heat radiated from the second heater 102b to the sixth heater 102f excluding the first heater 102a, the temperature in the box body 14 is maintained at a fixed level. In this case, it becomes difficult to detect a failure (leakage of active material, etc.) of the battery cell 18 and other failures at an early stage.

In contrast, in the embodiment of the present invention, in the case where disconnection occurs in the heater wire (the first heater wire 106a or the second heater wire 106b) of the first heater 102a or the second heater 102b, the entire first heater unit 100A including the first heater 102a and the second heater 102b does not function properly. Therefore, it becomes difficult to maintain the temperature in the box body 14 at a fixed temperature, and it becomes possible to detect a failure (leakage of active material, etc.) of the battery cell 18 and other failures based on the decrease in the temperature in the box body 14 at an early stage. If disconnection occurs in only any one of the third heater 102c to the sixth heater 102f, the entire second heater unit 100B including the third heater 102c to the sixth heater 102f does not function properly. Therefore, it becomes possible to detect a failure (leakage of active material, etc.) of the battery cell 18 and other failures at an early stage.

As described above, in the battery assembly container 10 according to the embodiment of the present invention, the wiring path can be simplified, and improvement in the work efficiency of wiring operation is achieved. Moreover, it is possible to extend the product life of the heater wire 106, and detect a failure due to disconnection of the heater wire 106, or disconnection of the heater wire 106 due to a failure of the battery cell 18 at an early stage.

Further, the heater wiring line 120 connected to the terminals of the first heater 102*a* to the sixth heater 102*f* are connected to the terminal frame 140 provided outside the box body 14. The first heater 102*a* and the second heater 102*b* are connected in series, and the third heater 102*c* to the sixth heater 102*f* are connected in series. Therefore, it is not necessary to consider the wiring path for serial connection in the box body 14, and the conventional box body 14 can be utilized as it is without any change of design, and reduction of the cost for design changes, etc. can be achieved.

Normally, each time the plurality of heaters 102 connected in series are changed, it is required to build a new wiring path and perform wiring operation. However, in the embodiment of the present invention, simply by changing the connection position of the jumper wire 148 connected to the terminal frame 140, the plurality of heaters 102 connected in series can be selected arbitrarily. Therefore, it is not required to build a new wiring path and perform wiring operation. Accordingly, improvement in the work efficiency of wiring operation is achieved.

In the above example, the invention has been described mainly in connection with the exemplary case where two heater units (first heater unit 100A and second heater unit 100B) are provided. However, the present invention can be easily applicable to other cases where three or more heater units are provided.

It is a matter of course that the battery assembly container according to the present invention is not limited to the embodiments described above, and various structures can be adopted without deviating from the gist of the present invention.

What is claimed is:

1. A battery assembly container comprising:
    a box body having an opening in an upper surface of the box body, a plurality of side walls and a bottom wall, and accommodating a battery assembly, the bottom wall and at least one of the side walls defining a box body space loaded with a first heat insulator;
    a lid body configured to close the opening of the box body, the lid body defining a lid body space substantially filled with a second heat insulator;
    heater units for a plurality of systems provided in the box body, at least one of the heater units including a plurality of heaters connected in series, each of the plurality of heaters of the at least one heater unit including: a heater wire provided in the box body, a positive side heater wire line connected to a positive terminal of the heater wire, and a negative side heater wiring line connected to a negative terminal of the heater wire; and
    a terminal frame provided outside the box body;
    wherein the terminal frame includes a plurality of positive side connection terminals, each one of the plurality of positive side connection terminals being connected to one of the positive side heater wiring lines, and a plurality of negative side connection terminals, each one of the plurality of negative side connection terminals being connected to one of the negative side heater wiring lines.

2. The battery assembly container according to claim 1, wherein the heater units for the plurality of systems include:
    a first heater unit provided at a bottom of the box body; and
    a second heater unit provided along one of the side walls of the box body.

3. The battery assembly container according to claim 1, wherein the terminal frame further includes:
    one or more jumper wires electrically connecting the positive side connection terminals and the negative side connection terminals corresponding respectively to the plurality of heaters connected in series.

4. The battery assembly container according to claim 1, wherein the terminal frame further includes:
    a positive side power supply terminal connected to a positive terminal of a power supply and
    a negative side power supply terminal connected to a negative terminal of the power supply;
    the positive side connection terminal connected to the positive side heater wiring line of the heater positioned at one end of serial connection among the plurality of heaters and the positive side power supply terminal are connected electrically; and
    the negative side connection terminal connected to the negative side heater wiring line of the heater positioned at another end of serial connection among the plurality of heaters and the negative side power supply terminal are connected electrically.

\* \* \* \* \*